(12) United States Patent
Zhuang et al.

(10) Patent No.: US 12,527,059 B2
(45) Date of Patent: Jan. 13, 2026

(54) GRAPHENE SENSOR AND PREPARATION METHOD AND USE THEREOF

(71) Applicant: Jimei University, Xiamen (CN)

(72) Inventors: Pingping Zhuang, Xiamen (CN); Jing Liu, Xiamen (CN); Chao Dou, Xiamen (CN); Han Yan, Xiamen (CN)

(73) Assignee: JIMEI UNIVERSITY, Xiamen (CN)

( * ) Notice: Subject to any disclaimer, the term of this patent is extended or adjusted under 35 U.S.C. 154(b) by 424 days.

(21) Appl. No.: 18/140,791

(22) Filed: Apr. 28, 2023

(65) Prior Publication Data
US 2023/0352537 A1  Nov. 2, 2023

(30) Foreign Application Priority Data
Apr. 29, 2022  (CN) .......................... 202210471603.4

(51) Int. Cl.
*H10D 62/80* (2025.01)
*G01N 27/12* (2006.01)
*H10D 30/67* (2025.01)
*H10H 20/01* (2025.01)

(52) U.S. Cl.
CPC ......... *H10D 62/882* (2025.01); *G01N 27/125* (2013.01); *H10D 30/6739* (2025.01); *H10H 20/032* (2025.01)

(58) Field of Classification Search
CPC ............ H10D 62/882; H10D 30/6739; H10D 30/6741; G01N 27/125; G01N 27/4146; G01N 33/18; G01N 33/188; H10H 20/032
See application file for complete search history.

(56) References Cited

U.S. PATENT DOCUMENTS

2020/0087150 A1* 3/2020 Wunch ................... C08L 75/00
2022/0196592 A1* 6/2022 Bouchalkha ........... G01N 15/06

FOREIGN PATENT DOCUMENTS

| CN | 113406154 A | 9/2021 |
| CN | 113533469 A | 10/2021 |

* cited by examiner

*Primary Examiner* — Mohammad A Rahman
(74) *Attorney, Agent, or Firm* — Kirk A. Wilson; Joseph T. Guy; Patent Filing Specialist Inc.

(57) ABSTRACT

The present disclosure provides a graphene sensor and a preparation method and use thereof, and relates to the technical field of sensors. The graphene sensor according to the present disclosure includes a substrate, and an electrode layer and a functionalized graphene film that are laminated on a single side of the substrate, where the functionalized graphene film is obtained by modifying a graphene film with triethylamine. According to the present disclosure, the triethylamine is used as a probe to modify the graphene film, so that nitrate nitrogen can be sensitively and accurately measured. The graphene sensor according to the present disclosure identifies an object to be measured based on chemical functional groups instead of a biological method, and has low costs and high chemical stability.

19 Claims, 3 Drawing Sheets

GRAPHENE SENSOR AND PREPARATION METHOD AND USE THEREOF

CROSS REFERENCE TO RELATED APPLICATION

This patent application claims the benefit and priority of Chinese Patent Application No. 202210471603.4, filed with the China National Intellectual Property Administration on Apr. 29, 2022, the disclosure of which is incorporated by reference herein in its entirety as part of the present application.

TECHNICAL FIELD

The present disclosure relates to the technical field of sensors, and in particular, to a graphene sensor and a preparation method and use thereof.

BACKGROUND

Nitrogen is one of the most important elements and basic parameters for evaluating water quality. Excessive discharge of industrial wastewater and leakage of industrial and agricultural fertilizers lead to a high nitrate content in a water system, which is harmful to aquatic ecosystems and may cause eutrophication of water. For example, a threshold nitrogen concentration (total nitrogen concentration) leading to eutrophication is 0.3 mg/L. Nitrogen in water mainly exists in the form of nitrate nitrogen ($NO_3$—N), and therefore, nitrate nitrogen is a key parameter for evaluating water eutrophication.

Conventional methods are used to measure nitrate nitrogen in water mainly based on an optical signal. For example, a phenol disulfonic acid (light absorption at 410 nm) measurement method and an ultraviolet spectrum (light absorption at 220 nm) measurement method may be used to measure the content of nitrate in water, with the measurement ranges being 0.02-2 mg/L and 0.08-4 mg/L, respectively. However, the above methods usually require a complicated pretreatment process to perform substance transformation and eliminate the interference of $SO_4^{2-}$, $Cl^-$, $CO_3^{2-}$, etc. Because these conventional methods need chemical reaction reagents and more treatment steps, the methods are not suitable for on-site real-time monitoring.

A field effect transistor (FET) sensor attracts extensive attention of researchers in the field of chemical and biomaterial sensing due to its advantages such as high sensitivity, real-time response and simplicity of operation. However, the specificity of currently-reported FET sensors for nitrate measurement depends on biological identification, such as FET sensors based on nitrogen reductase. Such sensors have high costs and need to be improved in chemical stability in a water environment.

SUMMARY

An objective of the present disclosure is to provide a graphene sensor and a preparation method and use thereof. The graphene sensor according to the present disclosure has low costs and high chemical stability, and can measure nitrate nitrogen in real time, in situ and at a low concentration.

To achieve the above objective, the present disclosure provides the following technical solutions:

The present disclosure provides a graphene sensor, including a substrate, and an electrode layer and a functionalized graphene film that are laminated on a single side of the substrate, where the functionalized graphene film is obtained by modifying a graphene film with triethylamine.

Preferably, the graphene film is a monoatomic layer graphene film.

Preferably, the electrode layer includes two metal electrodes arranged in parallel; the electrode layer is arranged between the substrate and the functionalized graphene film, and the functionalized graphene film is arranged on surfaces of the two metal electrodes and an exposed surface of the substrate.

Preferably, the metal electrode includes a functional layer and an adhesive layer that are stacked; and when the electrode layer is arranged between the substrate and the functionalized graphene film, the adhesive layer is in contact with the substrate; or when the functionalized graphene film is arranged between the substrate and the electrode layer, the adhesive layer is in contact with the functionalized graphene film.

Preferably, the functional layer is made of gold or platinum, and the adhesive layer is made of titanium.

The present disclosure provides a preparation method of the graphene sensor according to the above technical solution, including the following steps:

preparing a working layer on the single side of the substrate to obtain the graphene sensor, where the working layer includes an electrode layer and a functionalized graphene film that are stacked, and the functionalized graphene film is obtained by immersing a device including a graphene film in a triethylamine solution for modification treatment.

Preferably, the triethylamine solution has a concentration of 1.5-2.5 mmol/L.

Preferably, the modification treatment is performed at 15-40° C. for 0.5-1.5 h.

The present disclosure provides use of the graphene sensor according to the above technical solution or a graphene sensor prepared by using the preparation method according to the above technical solution in measurement of nitrate nitrogen.

Preferably, the nitrate nitrogen is nitrate nitrogen in water.

The present disclosure provides a graphene sensor, including a substrate, and an electrode layer and a functionalized graphene film that are laminated on a single side of the substrate, where the functionalized graphene film is obtained by modifying a graphene film with triethylamine. According to the present disclosure, the triethylamine (TEA, $N(CH_2CH_3)_3$) is used as a probe to modify the graphene film, so that nitrate nitrogen can be sensitively and accurately measured. Specifically, TEA is used as an electron donor of graphene, and the charge exchange between TEA and graphene leads to strong Coulomb attraction, which helps to ensure the reliability of the graphene sensor according to the present disclosure. TEA has a structure of "N—R3" (R3 stands for 3 ethyl groups) and can selectively recognize nitrate ions. The graphene sensor according to the present disclosure identifies an object to be measured based on chemical functional groups instead of a biological method, and has low costs and high chemical stability. The graphene sensor according to the present disclosure has the advantages of transient response (seconds) to nitrate nitrogen and a low limit of detection (LOD) (1.8 nM), has strong anti-interference capability, and still has good specificity to nitrate nitrogen in the presence of interfering ions ($Cl^-$, $CO_3^{2-}$ and $SO_4^{2-}$). Therefore, the graphene sensor according to the present disclosure is expected to become one of the most promising devices for real-time, in-situ and low-concentration detection of nitrate nitrogen, especially nitrate nitrogen in water, and is of great significance to the development of water quality monitoring electronic sensors.

DETAILED DESCRIPTION OF THE EMBODIMENTS

The present disclosure provides a graphene sensor, including a substrate, and an electrode layer and a functionalized graphene film that are laminated on a single side of the substrate, where the functionalized graphene film is obtained by modifying a graphene film with triethylamine.

The graphene sensor according to the present disclosure includes the substrate. In the present disclosure, no special restriction is imposed on the substrate, and a substrate well known to those skilled in the art may be used. In an example of the present disclosure, the substrate preferably includes a $SiO_2$ layer and a Si layer (the substrate is denoted as a $SiO_2$/Si sheet) that are stacked, the thickness of the $SiO_2$ layer is preferably 90 nm or 280 nm, and the $SiO_2$ layer further has a function of a back gate layer; and the thickness of the Si layer is preferably 1 mm. In an example of the present disclosure, the dimension of the substrate is preferably 1.5 cm×1.5 cm.

Figure 1:
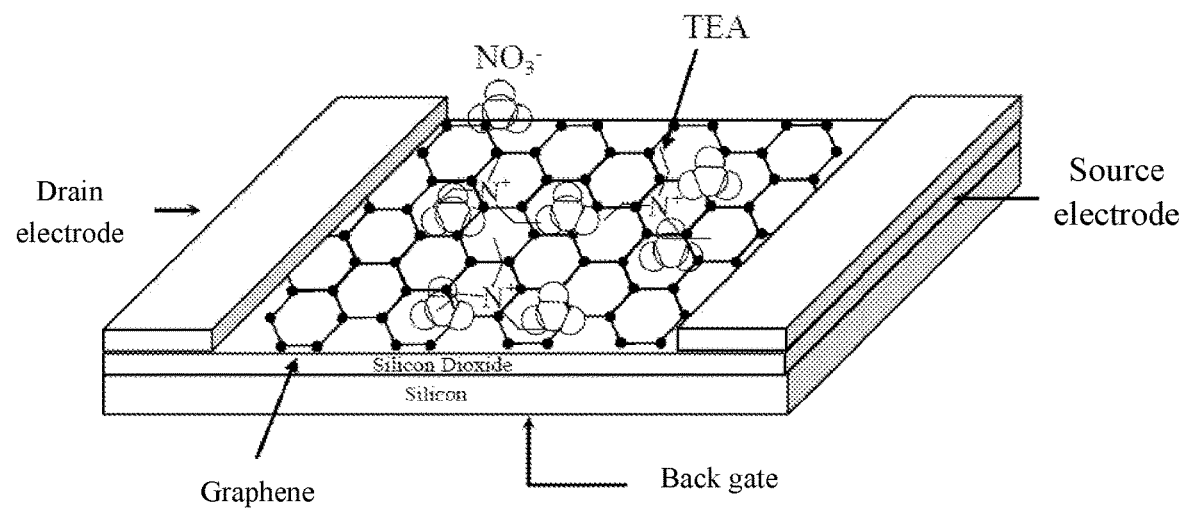
FIG. 1 is a schematic structural diagram of a graphene sensor according to the present disclosure.

The graphene sensor according to the present disclosure includes the electrode layer and the functionalized graphene film that are stacked on the single side of the substrate. Specifically, the graphene sensor according to the present disclosure has two structures, one structure includes a substrate, an electrode layer and a functionalized graphene film that are sequentially stacked (in this case, the graphene sensor is denoted as a first graphene sensor), and the other structure includes a substrate, a functionalized graphene film and an electrode layer that are sequentially stacked (in this case, the graphene sensor is denoted as a second graphene sensor, as shown in FIG. 1), where specifically, the electrode layer or the functionalized graphene film is arranged on a surface of the $SiO_2$ layer on the substrate.

In the present disclosure, the functionalized graphene film is obtained by modifying a graphene film with triethylamine, and the graphene film is preferably a monoatomic layer graphene film. In an example of the present disclosure, the thickness of the monoatomic layer graphene film is specifically 0.3 nm.

In the present disclosure, the electrode layer preferably includes two metal electrodes arranged in parallel, and specifically, the metal electrodes are arranged at two opposite ends of the substrate or the functionalized graphene film. In the present disclosure, when the electrode layer is arranged between the substrate and the functionalized graphene film (i.e., when the first graphene sensor is provided), the functionalized graphene film is specifically arranged on surfaces of the two metal electrodes and an exposed surface of the substrate. In the present disclosure, the metal electrode preferably includes a functional layer and an adhesive layer that are stacked; and when the electrode layer is arranged between the substrate and the functionalized graphene film (i.e., when the first graphene sensor is provided), specifically, the adhesive layer is in contact with the substrate; or when the functionalized graphene film is arranged between the substrate and the electrode layer (i.e., when the second graphene sensor is provided), specifically, the adhesive layer is in contact with the functionalized graphene film. In the present disclosure, the material of the functional layer preferably includes gold or platinum, and the thickness of the functional layer is preferably 45 nm; the material of the adhesive layer is preferably titanium, and the thickness of the adhesive layer is preferably 5 nm. In an example of the present disclosure, the metal electrode is specifically a patterned metal electrode.

The present disclosure provides a preparation method of the graphene sensor according to the above technical solution, including the following steps:

preparing a working layer on the single side of the substrate to obtain the graphene sensor, where the working layer includes an electrode layer and a functionalized graphene film that are stacked, and the functionalized graphene film is obtained by immersing a device including a graphene film in a triethylamine solution for modification treatment.

The first graphene sensor and the second graphene sensor will be described in detail below.

In the present disclosure, a preparation method of the first graphene sensor includes the following steps:

preparing an electrode layer on the single side of the substrate to obtain a substrate-electrode layer device;

arranging a graphene film on a surface of the electrode layer in the substrate-electrode layer device to obtain a substrate-electrode layer-graphene film device; and immersing the substrate-electrode layer-graphene film device in a triethylamine solution for modification treatment to obtain the first graphene sensor.

In the present disclosure, the electrode layer is prepared on the single side of the substrate to obtain the substrate-electrode layer device. In the present disclosure, no special restriction is imposed on a preparation method of the electrode layer, and a method well known to those skilled in the art may be used. In an example of the present disclosure, for the patterned metal electrode, a preparation method preferably includes:

coating a single side of a substrate with photoresist, and then sequentially performing first baking, patterned exposure, second baking, development, metal electrode plating by electron beam evaporation and lift-off to form the patterned metal electrode on the single side of the substrate.

In the present disclosure, the photoresist is preferably AZ5209 photoresist; a coating method of the photoresist is preferably spin coating, and the spin coating is performed at a rotation speed of preferably 600 rpm for preferably 1 min. In the present disclosure, the first baking is performed at preferably 90° C. for preferably 2 min. In the present disclosure, an exposure machine used in the patterned exposure is preferably an ultraviolet exposure machine (ultraviolet (UV) Lithography, Karl Suss MA6), and an exposure mode used is preferably a soft contact exposure mode; and conditions of the patterned exposure preferably include: exposure power of 7.5 mW, exposure time of 5 s, and a distance of 15 μm between a lithography plate and the surface of the substrate. In the present disclosure, the second baking is performed at preferably 110° C. for preferably 50 s. In the present disclosure, the developer used for the development is preferably an AZ400K developer, and the development is performed for preferably 95 s; and in the present disclosure, the exposed photoresist is removed by development. In the present disclosure, no special restriction is imposed on an operation method and conditions of metal electrode plating by electron beam evaporation, and a method and conditions well known to those skilled in the art may be used. After the metal electrode is plated by electron beam evaporation, according to the present disclosure, an obtained device is preferably soaked in acetone for 12 h, and then the remaining photoresist is subjected to lift-off and removed to form a patterned metal electrode on a single side of the substrate, to obtain a substrate-electrode layer device.

After the substrate-electrode layer device is obtained, according to the present disclosure, a graphene film is arranged on a surface of the electrode layer in the substrate-electrode layer device to obtain a substrate-electrode layer-graphene film device. In the present disclosure, a method for arranging the graphene film on the surface of the electrode layer in the substrate-electrode layer device preferably includes:

providing the graphene film, and transferring the graphene film to the surface of the electrode layer by using a wet transfer method.

In the present disclosure, the graphene film is preferably prepared by chemical vapor deposition (CVD), including the following steps:

pretreating Cu foil to obtain pretreated Cu foil; and
growing the graphene film on a surface of the pretreated Cu foil in the presence of methane.

In the present disclosure, the graphene film is preferably prepared in a tube furnace, specifically including: placing Cu foil in a central constant temperature area of a quartz tube of the tube furnace, and performing vacuum pumping to $10^{-6}$ Torr to remove air; then introducing hydrogen, with a flow rate controlled at 2 sccm and the air pressure kept at 20 mTorr, raising the temperature to 150° C. and keeping the temperature for 10 min to remove water vapor, and then pretreating the Cu foil. In the present disclosure, the Cu foil is pretreated at preferably 1035° C., and the temperature is kept for preferably 30 min. According to the present disclosure, by pretreatment, crystal grains of the Cu foil can be enlarged while an oxide on the surface of the Cu foil is removed, which helps to improve the quality of the graphene film.

After the pretreatment is completed, according to the present disclosure, preferably, the methane is introduced, with a flow rate controlled at 7 sccm and the air pressure controlled at 100 mTorr for 5 min; a hydrogen and methane pumping speed is changed, with the air pressure controlled at 900 mTorr for 1 min, to complete the graphene growth process. After the growth, according to the present disclosure, preferably, the tube furnace naturally cools to room temperature (25° C.), and a graphene film is prepared on the surface of the Cu foil, and is denoted as a Cu foil-graphene film material.

The graphene film prepared by using the method according to the present disclosure has a high carrier mobility, a high specific surface area, an atomic thickness and excellent biocompatibility and electrical conductivity equivalent to theoretical values.

After the graphene film is obtained, according to the present disclosure, preferably, the graphene film is transferred to the surface of the electrode layer by using a wet transfer method. In the present disclosure, specific operation steps of the wet transfer method preferably include:

dissolving a protective material in an organic solvent to obtain a protective material solution;
coating a surface of a graphene film in a Cu foil-graphene film material with the protective material solution, forming a protective layer on the surface of the graphene film, and then placing the Cu foil-graphene film material in an etching solution to corrode the Cu foil to obtain a graphene film-protective layer material floating on the liquid surface; and
picking up the graphene film-protective layer material by using a substrate-electrode layer device, so that the electrode layer is in contact with the graphene film, and then dissolving and removing the protective layer to complete the transfer of the graphene film.

In the present disclosure, the protective material preferably includes polymethyl methacrylate (PMMA) or polydimethylsiloxane (PDMS), the organic solvent preferably includes anisole, and the concentration of the protective material solution is preferably 4-10 wt %, more preferably 6 wt %. In the present disclosure, the method of coating the protective material solution is preferably spin coating. In the present disclosure, the etching solution is preferably an aqueous solution of $Fe(NO_3)_3$ or an aqueous solution of $(NH_4)_2S_2O_8$, and the concentration of the etching solution is preferably 0.03 g/mL. To make the electrode layer be in better contact with the graphene film, according to the present disclosure, after the graphene film-protective layer material is picked up by using the substrate-electrode layer device, preferably, drying treatment or low vacuum treatment is performed after drying in the air; the drying treatment is performed for preferably 60° C. for preferably 1 h; the low vacuum treatment is performed with a vacuum degree of preferably $10^{-2}$ Torr for preferably 12 h, and the low vacuum treatment is performed preferably at room temperature. In the present disclosure, a reagent used for dissolving and removing the protective layer is preferably acetone.

After the substrate-electrode layer-graphene film device is obtained, according to the present disclosure, the substrate-electrode layer-graphene film device is immersed in a triethylamine solution for modification treatment to obtain a first graphene sensor. In the present disclosure, the concentration of the triethylamine solution is preferably 1.5-2.5 mmol/L, more preferably 2 mmol/L; and a solvent of the triethylamine solution is preferably methanol. In the present disclosure, the modification treatment is performed at preferably 15-40° C., more preferably 20-30° C., and specifically, the modification treatment may be performed at room temperature (25° C.); and the modification treatment is performed for preferably 0.5-1.5 h, more preferably 1 h.

After the modification treatment is completed, according to the present disclosure, preferably, washing is performed sequentially with a phosphate buffered saline (PBS) buffer solution and water to obtain the first graphene sensor. In the present disclosure, the concentration of the PBS buffer solution used for washing is preferably 0.1 mM, and the washing is performed for preferably 3-4 times; the water used for the washing is preferably deionized water, and the washing is performed for preferably 3-4 times.

In the present disclosure, a preparation method of the second graphene sensor includes the following steps:

arranging a graphene film on the single side of the substrate to obtain a sub strate-graphene film device;
immersing the substrate-graphene film device in a triethylamine solution for modification treatment to obtain a substrate-functionalized graphene film device; and
preparing an electrode layer on a surface of the functionalized graphene film in the substrate-functionalized graphene film device to obtain the second graphene sensor.

In the present disclosure, methods of arrangement of the graphene film, modification treatment and preparation of the electrode layer involved in preparing the second graphene sensor are preferably implemented with reference to the preparation method of the first graphene sensor, and details are not described in detail herein again.

The present disclosure provides use of the graphene sensor according to the above technical solution or a graphene sensor prepared by using the preparation method according to the above technical solution in measurement of nitrate nitrogen. In the present disclosure, nitrate nitrogen is preferably nitrate nitrogen in water, and specifically nitrate ($NO_3^-$) in water. In the present disclosure, a method for measuring nitrate nitrogen by using the graphene sensor preferably includes:

immersing the graphene sensor in a solution to be measured for incubation; after the incubation is completed, taking out the graphene sensor, sequentially washing and drying, and then measuring resistance of the graphene sensor by using a semiconductor analyzer to obtain the concentration of the nitrate nitrogen.

In the present disclosure, the incubation is performed at preferably 15-40° C., more preferably 20-30° C., and specifically, the incubation may be performed at room temperature (25° C.); and the incubation is performed for preferably 2-4 h, more preferably 2-3 h. In the present disclosure, the washing is preferably performed sequentially with the PBS buffer solution and water, the concentration of the PBS buffer solution used for washing is preferably 0.1 mM, and the washing is performed for preferably 3-4 times; the water used for the washing is preferably deionized water, and the washing is performed for preferably 3-4 times.

The graphene sensor according to the present disclosure can rapidly and accurately measure the concentration of the nitrate nitrogen, and has instantaneous response (seconds) to $NO_3$—N and an LOD of 1.8 nM (0.153 µg/L), which is far lower than the threshold nitrogen concentration (0.3 mg/L) leading to eutrophication; and the graphene sensor has good specificity and strong anti-interference ability, and still shows high specificity for $NO_3$—N in the presence of $Cl^-$, $CO_3^{2-}$ and $SO_4^{2-}$ in water.

The technical solutions of the present disclosure will be clearly and completely described below with reference to the examples of the present disclosure. Apparently, the described examples are only a part of, not all of, the examples of the present disclosure. All other examples obtained by a person of ordinary skill in the art based on the examples of the present disclosure without creative efforts shall fall within the protection scope of the present disclosure.

Example 1

A graphene sensor in this example included a substrate, an electrode layer and a graphene film layer that were sequentially stacked, where the graphene film was modified with triethylamine, and the graphene film was a monoatomic layer graphene film with a thickness of 0.3 nm; the electrode layer included two metal electrodes arranged in parallel, namely a source electrode and a drain electrode. Each of the metal electrodes was a gold/titanium composite metal electrode, and the gold/titanium composite metal electrode included a gold layer and a titanium layer that were stacked. The titanium layer was arranged between the gold layer and the substrate as an adhesive layer, and had a thickness of 5 nm, and the gold layer had a thickness of 45 nm; the substrate was a $SiO_2$/Si sheet with a dimension of 1.5 cm×1.5 cm, and the $SiO_2$/Si sheet included a $SiO_2$ layer and a Si layer that were stacked, where the $SiO_2$ layer had a thickness of 280 nm, the Si layer had a thickness of 1 mm, and the $SiO_2$ layer was in contact with the electrode layer.

A preparation method of the graphene sensor included the following steps.

(1) Preparation of a Graphene Film by CVD

Cu foil was cut into 2 cm×2 cm, and placed in a central constant temperature area of a quartz tube of a tube furnace; vacuum pumping was performed to $10^{-6}$ Torr to remove air; hydrogen was introduced, with a flow rate controlled at 2 sccm and the air pressure kept at 20 mTorr, the temperature was raised to 150° C. and kept for 10 min to remove water vapor, and then the temperature was raised to 1,035° C. and kept for 30 min to enlarge the crystal grains of Cu foil while an oxide on a surface of the Cu foil was removed; then methane was introduced, with a flow rate controlled at 7 sccm and the air pressure controlled at 100 mTorr and kept for 5 min; a hydrogen and methane pumping speed was changed, with the air pressure controlled at 900 mTorr and kept for 1 min, to complete the graphene growth process; and after the growth, the tube furnace naturally cooled to room temperature (25° C.), and a graphene film was prepared on the surface of the Cu foil, and was denoted as a copper-based graphene film.

(2) Preparation of Metal Electrodes on the Single Side of the Substrate

Taking a $SiO_2$/Si sheet as the substrate, photoresist (AZ5209) was added dropwise on a surface of the $SiO_2$ layer on the substrate and spin-coated at a rotation speed of 600 rmp for 1 min, then the substrate was placed on a heating plate for baking at 90° C. for 2 min, and patterned exposure was performed by using an ultraviolet exposure machine (UV Lithography, Karl Suss MA6), where a soft contact exposure mode was selected, and parameters of the patterned exposure were as follows: exposure power of 7.5 mW, exposure time of 5 s, and a distance of 15 µm between a lithography plate and the surface of the substrate; after the exposure, the substrate was placed on the heating plate for baking at 110° C. for 50 s, and then development was performed for 95 s with a developer (AZ 400K developer) to remove the exposed photoresist; gold/titanium composite metal electrodes (i.e., a source electrode and a drain electrode) were prepared at two opposite ends of the surface of the obtained substrate by electron beam evaporation and then soaked in acetone for 12 h, the remaining photoresist was removed by using a lift-off process, and patterned gold/titanium composite metal electrodes were formed on the single side of the substrate, to obtain a substrate-metal electrode device.

(3) Transfer of the Graphene Film

PMMA was dissolved in anisole to obtain a PMMA solution with a concentration of 6 wt %, a 0.5 cm×0.5 cm copper-based graphene film was obtained through cutting, the PMMA solution was spin-coated on the surface of the graphene film to form a PMMA protective layer, and then the copper-based graphene film was placed in an aqueous solution of $Fe(NO_3)_3$ with a concentration of 0.03 g/mL to corrode the Cu foil, to obtain a graphene film-PMMA protective layer material floating on the liquid surface; the graphene film-PMMA protective layer material was picked up by using the substrate-metal electrode device, dried in the air and then dried in a 60° C. drying oven for 1 h, so that the graphene film was in better contact with the substrate-metal electrode device; finally, the PMMA protective layer was dissolved by acetone, and the graphene film was transferred to the substrate including the patterned gold/titanium composite metal electrodes, to obtain a substrate-metal electrode-graphene film device.

(4) Functional Modification of the Graphene Film

Triethylamine was dissolved in methanol to obtain a triethylamine solution with a concentration of 2 mmol/L; and the substrate-metal electrode-graphene film device was immersed in the triethylamine solution, incubated for 1 h at room temperature, and then washed with a PBS buffer solution with a concentration of 0.1 mM for 3 times and deionized water for 3 times to obtain the graphene sensor.

Comparative Example 1

A sensor was prepared according to the method of Example 1, except only that step (4) was omitted, that is, the step of modifying the graphene film with triethylamine was omitted.

Use Example 1

The graphene sensor prepared in Example 1 was immersed in an aqueous solution of $NaNO_3$ with a concentration of 10 μM as a solution to be measured, and incubated for 2 h at room temperature; then the graphene sensor was taken out, washed with a PBS buffer solution with a concentration of 0.1 mM for three times and deionized water for three times and dried, and the resistance of the graphene sensor was measured by a semiconductor analyzer; the above aqueous solution of $NaNO_3$ was diluted with a 0.1 mM PBS buffer solution to the concentrations of 0.1 μM and 1 μM respectively, then the diluents were incubated for 2 h as the solutions to be measured according to the above method, and resistance changes of the graphene sensor under different concentrations of the solutions to be measured were measured according to the above method. The results are shown in FIG. 2A and FIG. 2B.

Figure 2A:
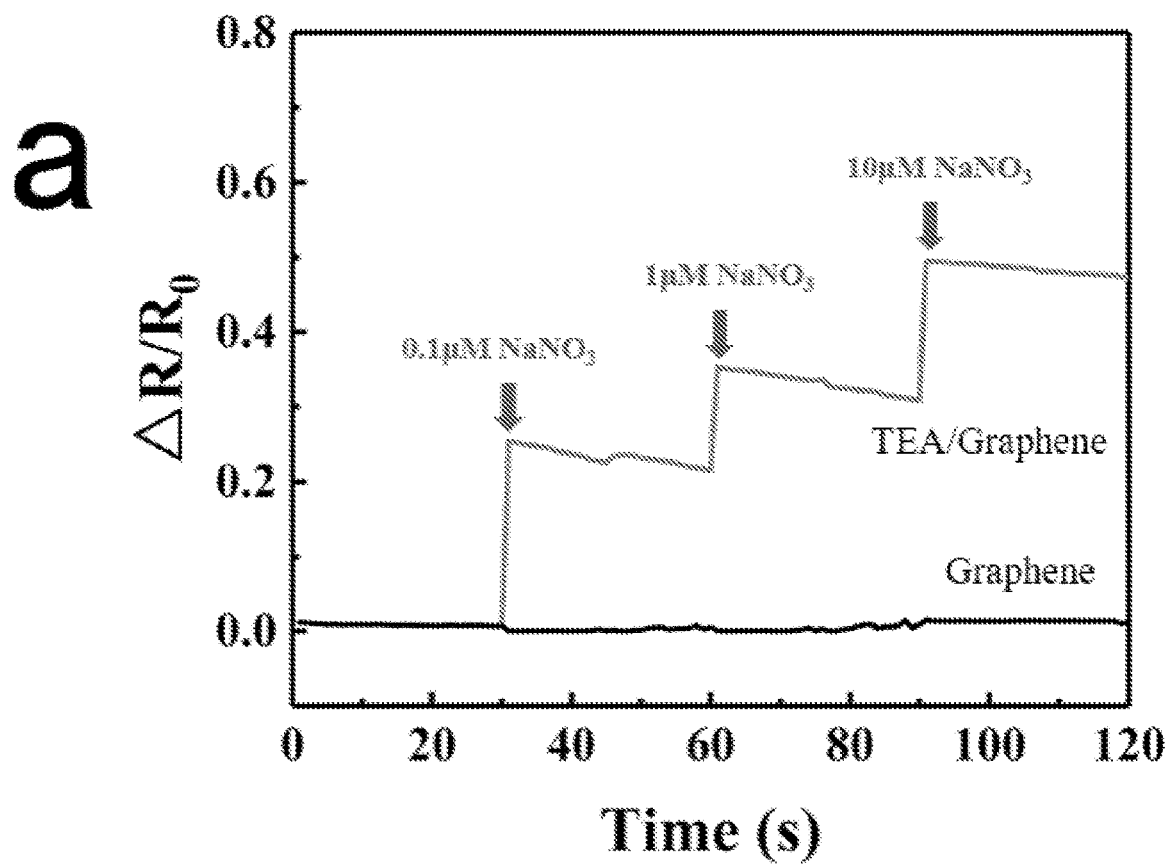
FIGS. 2A-D are performance test diagrams of a graphene sensor according to the present disclosure.
Figure 2B:
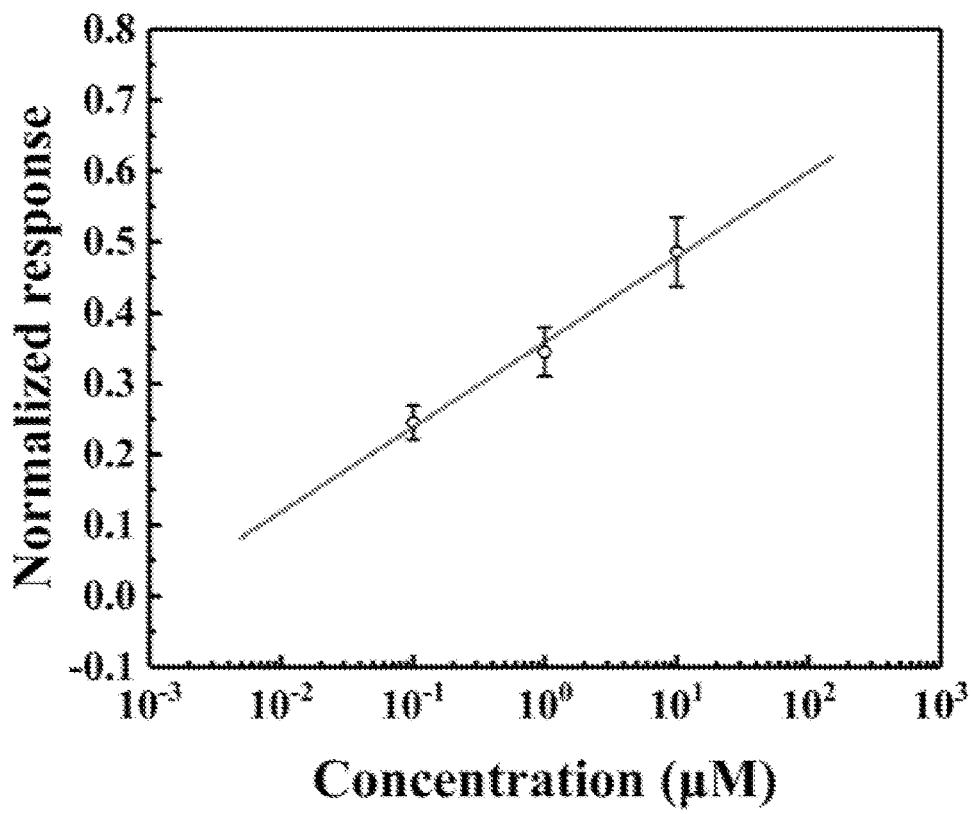

As shown in FIG. 2A, the response of the graphene sensor was studied by defining normalized resistance $[\Delta R/R_0]=(R-R_0)/R_0$, where R is real-time resistance measured after treatment of the aqueous solution of $NaNO_3$, and $R_0$ was resistance of the graphene sensor before the treatment of the aqueous solution of $NaNO_3$. When the graphene sensor was placed in aqueous solutions of $NaNO_3$ with different concentrations, the resistance changed sharply and then remained relatively stable. A higher concentration of the solution to be measured indicated a greater change of the normalized resistance, and the concentration of the solution to be measured was basically linear with the normalized resistance (as shown in FIG. 2B).

To verify the reaction between TEA molecules and nitrate anions, the sensor without modification by TEA molecules that was prepared in comparative Example 1 was used to measure nitrate anions with different concentrations, and results showed that no change of normalized resistance was caused (as shown in FIG. 2A). This shows that the modification of the surface of the graphene film with TEA molecules is the key to sensitive measurement of nitrate.

Figure 2C:
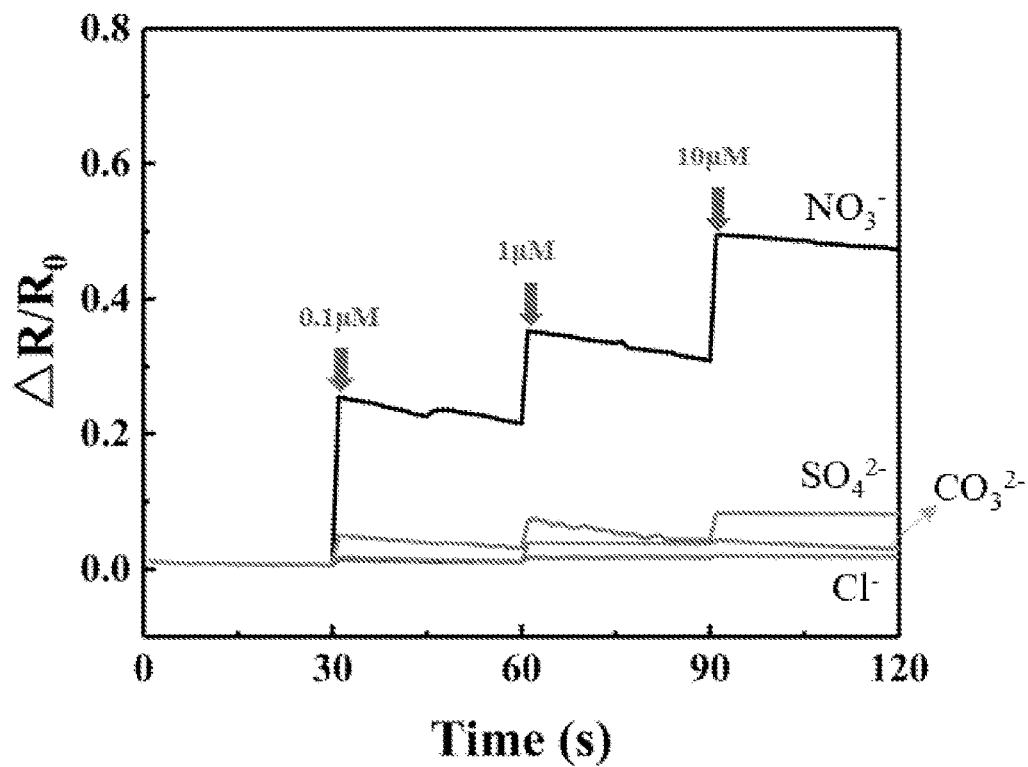

Specificity is an indispensable attribute in establishing a sensor. To explore the specificity of the graphene sensor according to the present disclosure for nitrate, three common anions, $Cl^-$, $CO_3^{2-}$ and $SO_4^{2-}$ at different concentrations were tested according to the above method, and the results are shown in FIG. 2C. It can be seen that compared that for $NO_3^-$ at the same concentration, the graphene sensor according to the present disclosure had almost no response to $Cl^-$, $CO_3^{2}$ and $SO_4^{2-}$.

Figure 2D:
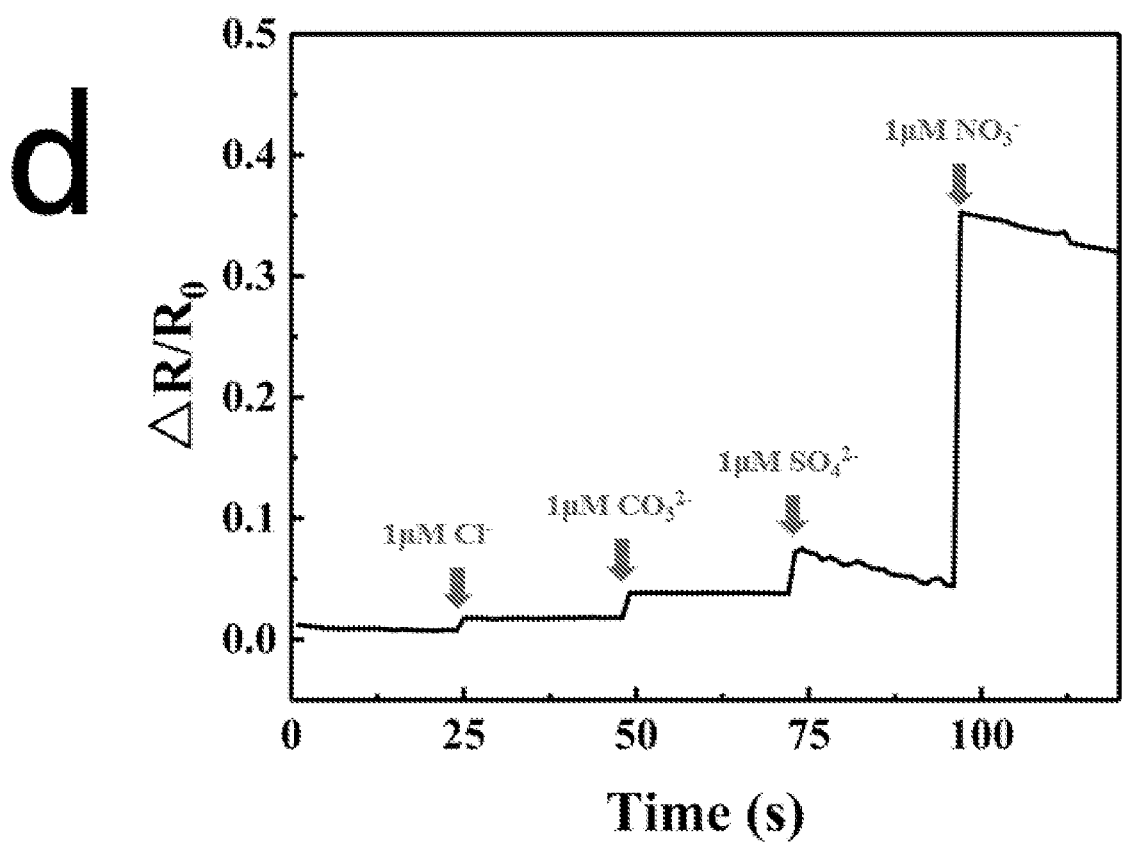

To further test whether $Cl^-$, $CO_3^{2-}$ and $SO_4^{2-}$ interfere with the measurement of $NO_3^-$, 1 μM $Cl^-$ solution, 1 μM $CO_3^{2-}$ solution, 1 μM $SO_4^{2-}$ solution and 1 μM $NO_3^-$ solution were sequentially added to the same graphene sensor, and the response of the graphene sensor was observed when each anion solution was added. The results are shown in FIG. 2D. It can be seen that when $Cl^-$, $CO_3^{2-}$ and $SO_4^{2-}$ were added, the graphene sensor had a relatively weak response, but when $NO_3^-$ was added, the graphene sensor had a very prominent response, which shows that the graphene sensor according to the present disclosure can specifically measure $NO_3^-$. The graphene sensor in the present disclosure takes triethylamine as a nitrate probe, which has different affinities with different anions. Triethylamine has a relatively long alkyl group and relatively strong hydrophobicity, and therefore, anions with relatively low hydrous Gibbs free energy are preferentially captured. Since the hydrous Gibbs free energy of nitrate is much smaller than that of other anions, triethylamine has a better affinity with nitrate even in the presence of high-concentration competitive anions.

It can be seen from the above examples that the graphene sensor with triethylamine as a probe molecule according to the present disclosure can measure nitrate ions in water with high sensitivity, high specificity and rapidity, and the LOD is 1.8 nM (0.153 μg/L), which is far lower than the threshold nitrogen concentration (0.3 mg/L) leading to eutrophication. In addition, the graphene sensor according to the present disclosure has high chemical stability, low costs and simpleness of manufacture, and is expected to be used for real-time and long-term measurement of nitrate ions in water.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A graphene sensor, comprising a substrate, and an electrode layer and a functionalized graphene film that are laminated on a single side of the substrate,
    wherein the functionalized graphene film is obtained by modifying a graphene film with triethylamine; and
    wherein the electrode layer comprises two metal electrodes arranged in parallel; the electrode layer is arranged between the substrate and the functionalized graphene film, and the functionalized graphene film is arranged on surfaces of the two metal electrodes and an exposed surface of the substrate.

2. The graphene sensor according to claim 1, wherein the graphene film is a monoatomic layer graphene film.

3. The graphene sensor according to claim 1, wherein each of the metal electrodes comprises a functional layer and an adhesive layer that are stacked; and when the electrode layer is arranged between the substrate and the functionalized graphene film, the adhesive layer is in contact with the substrate; or
    when the functionalized graphene film is arranged between the substrate and the electrode layer, the adhesive layer is in contact with the functionalized graphene film.

4. The graphene sensor according to claim 3, wherein the functional layer is made of gold or platinum, and the adhesive layer is made of titanium.

5. A preparation method of the graphene sensor according to claim 1, comprising the following steps:
    preparing a working layer on the single side of the substrate to obtain the graphene sensor, wherein the working layer comprises an electrode layer and a functionalized graphene film that are stacked, and the functionalized graphene film is obtained by immersing a device comprising a graphene film in a triethylamine solution for modification treatment.

6. The preparation method according to claim 5, wherein the graphene film is a monoatomic layer graphene film.

7. The preparation method according to claim 5, wherein the electrode layer comprises two metal electrodes arranged in parallel; the electrode layer is arranged between the substrate and the functionalized graphene film, and the functionalized graphene film is arranged on surfaces of the two metal electrodes and an exposed surface of the substrate.

8. The preparation method according to claim 7, wherein the metal electrode comprise a functional layer and an adhesive layer that are stacked; and when the electrode layer is arranged between the substrate and the functionalized graphene film, the adhesive layer is in contact with the substrate; or when the functionalized graphene film is arranged between the substrate and the electrode layer, the adhesive layer is in contact with the functionalized graphene film.

9. The preparation method according to claim 8, wherein the functional layer is made of gold or platinum, and the adhesive layer is made of titanium.

10. The preparation method according to claim 5, wherein the triethylamine solution has a concentration of 1.5-2.5 mmol/L.

11. The preparation method according to claim 6, wherein the triethylamine solution has a concentration of 1.5-2.5 mmol/L.

12. The preparation method according to claim 7, wherein the triethylamine solution has a concentration of 1.5-2.5 mmol/L.

13. The preparation method according to claim 8, wherein the triethylamine solution has a concentration of 1.5-2.5 mmol/L.

14. The preparation method according to claim 9, wherein the triethylamine solution has a concentration of 1.5-2.5 mmol/L.

15. The preparation method according to claim 5, wherein the modification treatment is performed at 15-40° C. for 0.5-1.5 h.

16. The preparation method according to claim 6, wherein the modification treatment is performed at 15-40° C. for 0.5-1.5 h.

17. The preparation method according to claim 7, wherein the modification treatment is performed at 15-40° C. for 0.5-1.5 h.

18. The preparation method according to claim 8, wherein the modification treatment is performed at 15-40° C. for 0.5-1.5 h.

19. A method for detecting nitrate nitrogen in water, comprising using the graphene sensor according to claim 1 to conduct detection of the nitrate nitrogen.

* * * * *